(12) United States Patent
Liao

(10) Patent No.: US 9,560,248 B2
(45) Date of Patent: Jan. 31, 2017

(54) CAMERA MODULE HAVING TWO LENS MODULES

(71) Applicant: HON HAI PRECISION INDUSTRY CO., LTD., New Taipei (TW)

(72) Inventor: Chia-Hung Liao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/837,573

(22) Filed: Aug. 27, 2015

(65) Prior Publication Data
US 2016/0127621 A1    May 5, 2016

(51) Int. Cl.
| | | |
|---|---|---|
| H04N 9/07 | (2006.01) | |
| H04N 5/225 | (2006.01) | |
| G02B 7/08 | (2006.01) | |
| G02B 7/02 | (2006.01) | |
| G02B 13/00 | (2006.01) | |
| G03B 17/12 | (2006.01) | |
| G03B 37/04 | (2006.01) | |
| G03B 5/02 | (2006.01) | |
| G03B 5/04 | (2006.01) | |

(52) U.S. Cl.
CPC ............ *H04N 5/2254* (2013.01); *G02B 7/021* (2013.01); *G02B 7/022* (2013.01); *G02B 7/08* (2013.01); *G02B 13/0015* (2013.01); *G03B 17/12* (2013.01); *G03B 37/04* (2013.01); *H04N 5/2252* (2013.01); *H04N 5/2257* (2013.01); *G03B 5/02* (2013.01); *G03B 5/04* (2013.01)

(58) Field of Classification Search
None
See application file for complete search history.

(56) References Cited

U.S. PATENT DOCUMENTS

| | | | | |
|---|---|---|---|---|
| 5,883,663 A | * | 3/1999 | Siwko ................ | H05K 13/0413 348/125 |
| 8,208,062 B2 | * | 6/2012 | Lin ........................ | G03B 17/14 348/373 |
| 2005/0046740 A1 | * | 3/2005 | Davis ................... | H04N 5/2254 348/373 |
| 2007/0269205 A1 | * | 11/2007 | Lee ........................ | G03B 17/02 396/542 |
| 2008/0024738 A1 | * | 1/2008 | Nozaki ................ | G02B 13/001 353/101 |
| 2009/0262425 A1 | * | 10/2009 | Kimura ................... | G03B 5/00 359/557 |

(Continued)

*Primary Examiner* — Gary C Vieaux
(74) *Attorney, Agent, or Firm* — Zhigang Ma

(57) ABSTRACT

A camera module can include a lens housing, an imaging unit and a driving motor. The lens housing can include a first lens module, a second lens module and a lens holder holding the first lens module and the second lens module. The imaging unit is located between the first lens module and the second lens module. The imaging unit is in optical alignment with the first lens module and the second lens module. The driving motor is coupled to the lens housing and configured to drive the lens housing to move relative to the imaging unit. When the driving motor drives the first lens module and the second lens module to move relative to the imaging unit, distance between the imaging unit and the first lens module is changed, or a distance between the imaging unit and the second lens module is changed.

17 Claims, 2 Drawing Sheets

(56) References Cited

U.S. PATENT DOCUMENTS

| | | | |
|---|---|---|---|
| 2010/0033616 A1* | 2/2010 | Huang | G02B 7/021 348/335 |
| 2010/0231779 A1* | 9/2010 | Lin | G02B 7/021 348/335 |
| 2012/0194728 A1* | 8/2012 | Kim | G02B 3/00 348/342 |
| 2013/0194466 A1* | 8/2013 | Cheng | G03B 17/14 348/294 |
| 2015/0138423 A1* | 5/2015 | Laroia | G02B 13/0065 348/340 |

* cited by examiner

CAMERA MODULE HAVING TWO LENS MODULES

FIELD

The subject matter herein generally relates to camera modules, and particularly to a camera module with two lens modules.

BACKGROUND

Electronic devices can be equipped to include a camera module. Electronic devices can include a mobile phone, a computer, a digital camera, a portable imaging device and the like. The camera module generally includes a driving motor, a lens module driven by the driving motor, and a photosensitive component in optical alignment with the lens module.

BRIEF DESCRIPTION OF THE DRAWINGS

Implementations of the present technology will now be described, by way of example only, with reference to the attached figures.

DETAILED DESCRIPTION

Figure 1:
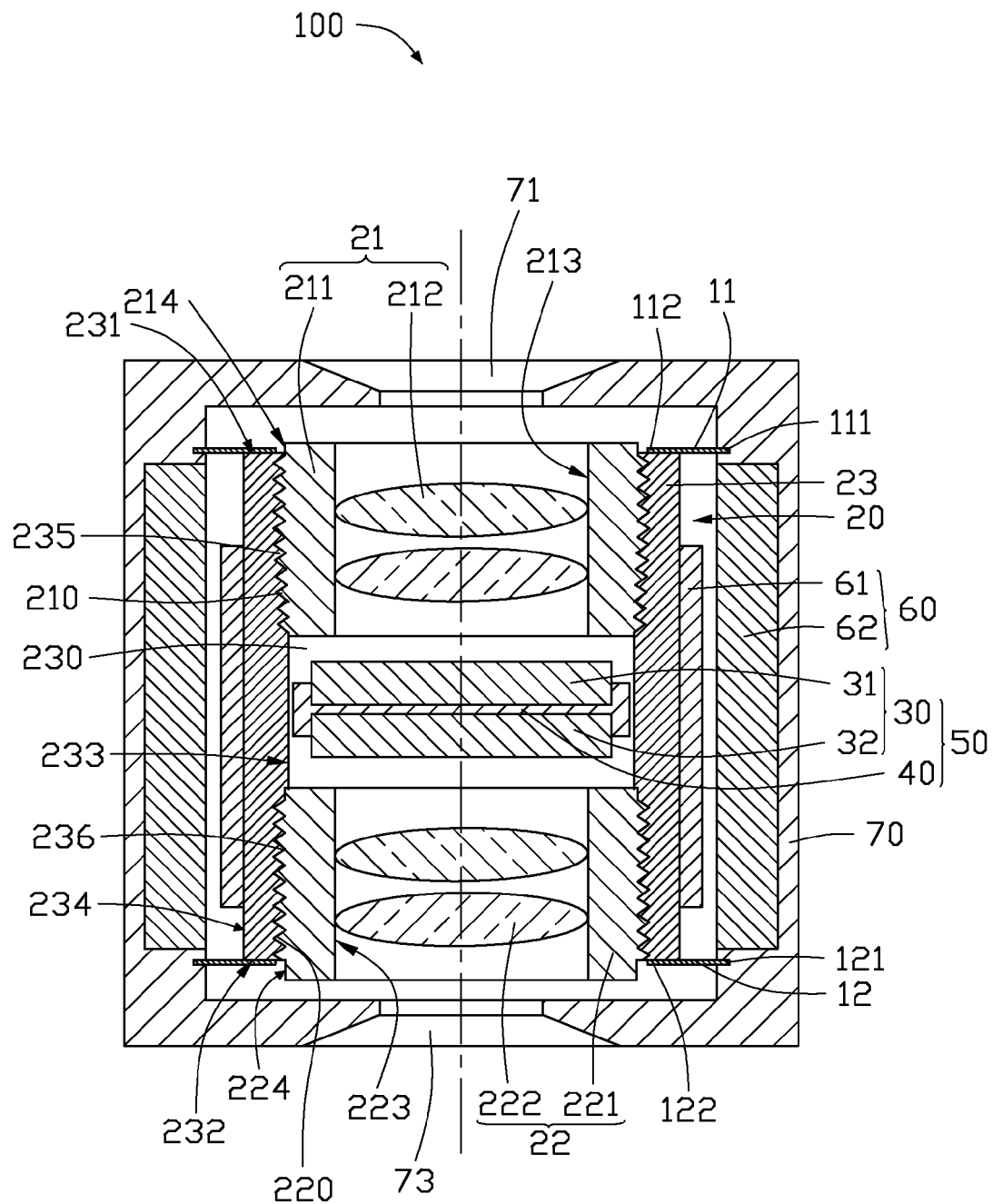
FIG. 1 is a cross sectional view of a camera module in accordance with an embodiment of the present disclosure in a first configuration.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a camera module. The camera module can include a lens housing, an imaging unit and a driving motor. The lens housing can include a first lens module, a second lens module and a lens holder holding the first lens module and the second lens module. The imaging unit is located between the first lens module and the second lens module. The imaging unit is in optical alignment with the first lens module and the second lens module. The driving motor is coupled to the lens housing and configured to drive the lens housing to move relative to the imaging unit. When the driving motor drives the first lens module and the second lens module to move relative to the imaging unit, a distance between the imaging unit and the first lens module is changed, and/or a distance between the imaging unit and the second lens module is changed.

FIG. 1 illustrates a camera module 100 an embodiment of the present disclosure. The camera module 100 can include a lens housing 20, an imaging unit 50, a driving motor 60 and a housing 70 receiving the lens housing 20, the imaging unit 50 and the driving motor 60 therein.

The lens housing 20 can include a first lens module 21, a second lens module 22 and a lens holder 23 holding the first lens module 21 and the second lens module 22. The first lens module 21 and the second lens module 22 are held at two opposite end portions of the lens holder 23, respectively.

The lens holder 23 can define a receiving room 230. The first lens module 21, the second lens module 22 and the imaging unit 50 are received in the receiving room 230.

The lens holder 23 can be a sleeve configuration surrounding the first lens module 21, the second lens module 22 and the imaging unit 50 in the receiving room 230. The lens holder 23 can include an inner face 233, an outer face 234 opposite to the inner face 233, a first end face 231 and a second end face 232 connecting the inner face 233 and the outer face 234. The inner face 233 forms a plurality of first screw threads 235 corresponding to the first lens module 21 and a plurality of second screw threads 236 corresponding to the second lens module 22. The first screw threads 235 are spaced from the second screw threads 236.

The first lens module 21 can include a first sleeve 211 and a first lens 212 received in the first sleeve 211. The first sleeve 211 can be a hollow cylinder. The first sleeve 211 includes a first inner face 213 surrounding the first lens 212 and a first outer face 214 opposite to the first inner face 213. The first lens 212 is coupled to the first inner face 213. The first outer face 214 forms a plurality of first external threads 210 coupled to the first screw threads 235 of the lens holder 23. In the illustrated embodiment, a number of the first lens 212 can be, but not limited to two.

The second lens module 22 can include a second sleeve 221 and a second lens 222 received in the second sleeve 221. The second sleeve 221 can be a hollow cylinder. The second sleeve 221 includes a second inner face 223 surrounding the second lens 222 and a second outer face 224 opposite to the second inner face 223. The second lens 222 is coupled to the second inner face 223. The second outer face 224 forms a plurality of second external threads 220 coupled to the second screw threads 236 of the lens holder 23. In this embodiment, a number of the second lens 222 can be, but not limited to two.

The first lens module 21 and the second lens module 22 can have same configurations or other parameters.

The camera module 100 can further include a first elastic member 11, a second elastic member 12 coupled to the lens holder 23 and the housing 70.

The first elastic member 11 can be in a sheet configuration. The first elastic member 11 can include a first end portion 111 and a second end portion 112. The first end portion 111 is coupled to the housing 70. The second end portion 112 is abutted against the first end face 231 of the lens holder 23. In at least one embodiment, the first end portion 111 is fixed to the housing 70, the second end portion 112 can be movable relative to the first end face 231 of the lens holder 23. In at least one alternative embodiment, the first end portion 111 is abutted against and movable relative to the housing 70, the second end portion 112 is fixedly coupled to the first end face 231 of the lens holder 23.

The second elastic member 12 can be in a sheet configuration. The second elastic member 12 can include a third end portion 121 and a fourth end portion 122. The third end portion 121 is coupled to the housing 70. The fourth end portion 122 is abutted against the second end face 232 of the lens holder 23. In at least one embodiment, the third end portion 121 is fixed to the housing 70, the fourth end portion 122 can be movable relative to the second end face 232 of the lens holder 23. In at least one alternative embodiment, the third end portion 121 is abutted against and movable relative to the housing 70, the fourth end portion 122 is fixedly coupled to the second end face 232 of the lens holder 23.

The driving motor 60 can include a coil 61 and a magnet 62. The coil 61 is winded on the outer face 234 of the lens holder 23. The magnet 62 is coupled to housing 70 and corresponding to the coil 61. In at least one embodiment, the magnet 62 is embedded into a wall of the housing 70 and exposed to the coil 61.

In at least one alternative embodiment, the coil 61 can be coupled to the housing 70, the magnet 62 can be coupled to the lens holder 23 of the lens housing 20.

The magnet 62 forms a magnet filed around the lens housing 20. The lens housing 20 can be driven to move along an optical axis of the lens housing 20 relative to the housing 70, when the coil 61 is energized with electric current.

The imaging unit 50 can include a photosensitive component 30 and a circuit board 40. The imaging unit 50 is received in the receiving room 230 of the lens holder 23. The imaging unit 50 is unmovable relative to the housing 70. The imaging unit 50 is located between the first lens module 21 and the second lens module 22. When the camera module 100 is off working state, a distance between the imaging unit 50 and the first lens module 21 is equal to a distance between the imaging unit 50 and the second lens module 22. When the camera module is in working state, the driving motor 60 drives the first lens module 21 and the second lens module 22 to move relative to the imaging unit 50, to change the distance between the imaging unit 50 and the first lens module 21 and the distance between the imaging unit 50 and the second lens module 22.

The photosensitive component 30 can include a first image sensor 31 and a second image sensor 32. The first image sensor 31 and the second image sensor 32 are coupled to the circuit board 40. The first image sensor 31 is in optical alignment with the first lens module 21. The second image sensor 32 is in optical alignment with the second lens module 22.

The first image sensor 31 and the second image sensor 32 each can be a Charge Coupled Device (CCD) or a Complementary Metal Oxide Semiconductor (CMOS), which can change optical signals to electric signals.

The circuit board 40 is coupled to the housing 70. The circuit board 40 can include a support seat. The first image sensor 31 and the second image sensor 32 are coupled to the support seat of the circuit board 40. In at least one embodiment, the first image sensor 31 and the second image sensor 32 can be fixed to the support seat by glue. The circuit board 40 is electrically coupled to the photosensitive component 30, so that signals from the first image sensor 31 and the second image sensor 32 can be transmitted to the circuit board 40.

The circuit board 40 can be made of material of glass fiber, reinforced plastic or ceramic or other materials.

The housing 70 defines a first window 71 and a second window 73 at two opposite ends thereof. The first window 71 is adjacent to the first lens module 21. The second window 73 is adjacent to the second lens module 22. The first window 71 has a center located on an optical axis of the first lens module 21. The second window 73 has a center located on an optical axis of the second lens module 22. The housing 70 defines a central axis extending through the centers of the first window 71 and the second window 73. The central axis is overlapped the optical axles of the first lens module 21 and the second lens module 22.

Figure 2:
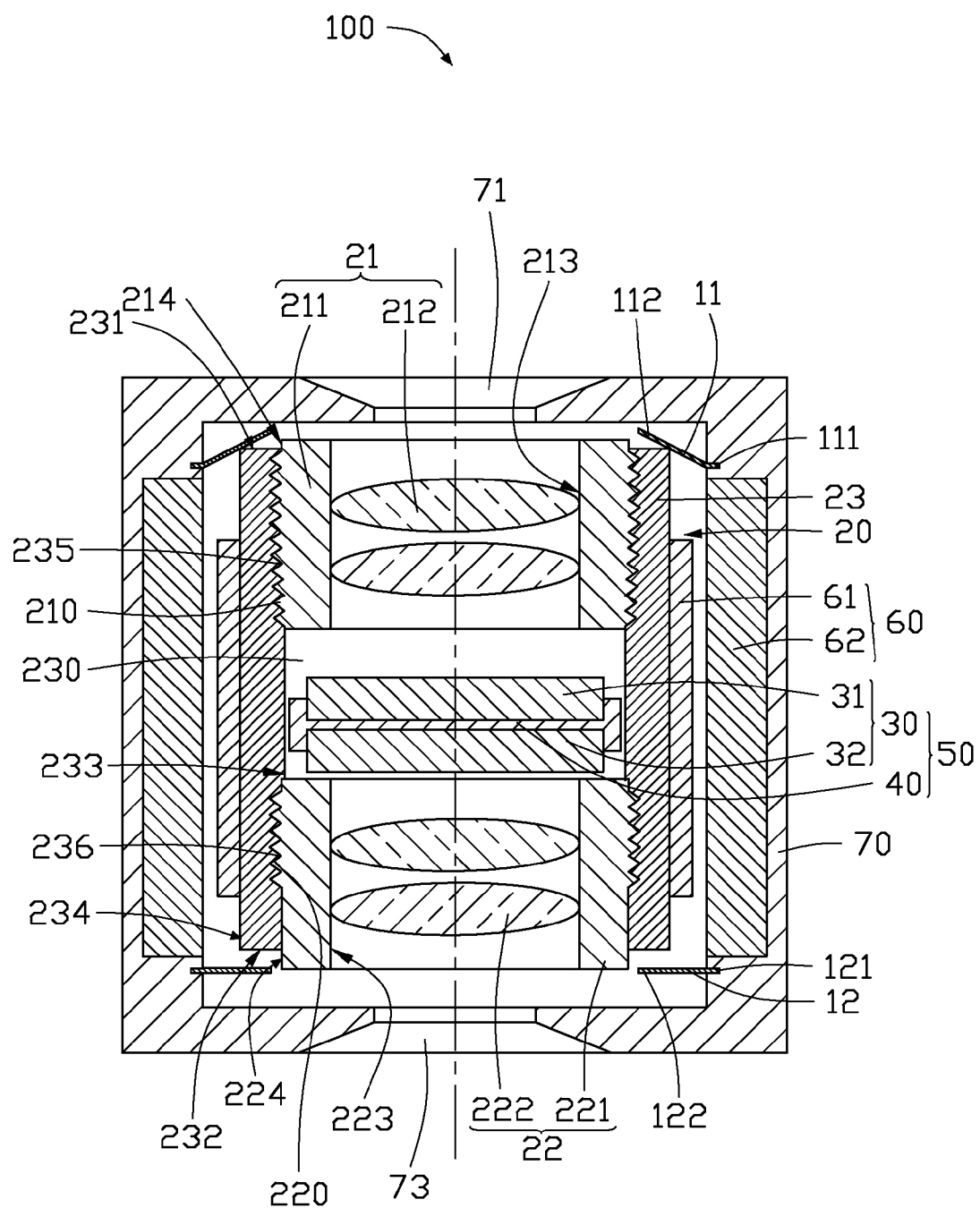
FIG. 2 is a cross sectional view of the camera module in FIG. 1 in a second configuration.

FIG. 2 illustrates that the camera module 100 is in a second configuration. The coil 61 is energized with electric current, the lens holder 23 moves along the central axis of the housing 70. When the first lens module 21 starts a shooting function, the driving motor 60 drives the lens holder 23 to move, the first lens module 21 moves towards the first window 71 of the housing 70, and away from the imaging unit 50. The first elastic member 11 is deformed and the second end portion 112 of the first elastic member 11 moves away from the imaging unit 50. The first lens module 21 completes an autofocus function. When the second lens module 21 starts shooting function, the driving motor 60 drives the lens holder 23 to move, the second lens module 22 moves towards the second window 73 of the housing 70, and away from the imaging unit 50. The second elastic member 12 is deformed and the fourth end portion 122 of the second elastic member 12 moves away from the imaging unit 50. The second lens module 21 completes autofocus.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A camera module comprising:
a lens housing comprising a first lens module, a second lens module, and a lens holder holding the first lens module and the second lens module, each of the first lens module and the second lens module including a lens;
an imaging unit located between the first lens module and the second lens module, the imaging unit being in optical alignment with the first lens module and the second lens module, the lens holder defining a receiving room for receiving the first lens module, the second lens module, and the imaging unit; and
a driving motor coupled to the lens housing and configured to drive the lens housing to move relative to the imaging unit;
wherein the driving motor drives the first lens module and the second lens module to move relative to the imaging unit such that a distance between the imaging unit and the first lens module is changed or a distance between the imaging unit and the second lens module is changed.

2. The camera module of claim 1, wherein the first lens module and the second lens module are positioned at two opposite end portions of the lens holder.

3. The camera module of claim 1, further comprising a housing for receiving the lens housing, the imaging unit and the driving motor.

4. The camera module of claim 3, wherein the imaging unit is unmovable relative to the housing.

5. The camera module of claim 3, wherein the housing defines a first window adjacent to the first lens module and a second window adjacent to the second lens module.

6. The camera module of claim 5, wherein the first window and the second window are at two opposite ends of the housing, respectively.

7. The camera module of claim 5, wherein the first window has a center located on an optical axis of the first lens module.

8. The camera module of claim 5, wherein the second window has a center located on an optical axis of the second lens module.

9. The camera module of claim 3, wherein the imaging unit comprises a circuit board and a photosensitive component coupled to the circuit board, the photosensitive component being in optical alignment with the first lens module and the second lens module.

10. The camera module of claim 9, wherein the circuit board is coupled to the housing.

11. The camera module of claim 9, wherein the photosensitive component comprises a first image sensor in optical alignment with the first lens module and a second image sensor in optical alignment with the second lens module.

12. The camera module of claim 3, wherein the driving motor comprises a coil coupled to the lens holder and a magnet coupled to the housing, the magnet corresponding to the coil.

13. The camera module of claim 3, further comprising a first elastic member and a second elastic member, wherein the first elastic member is coupled to the housing and a first end of the lens holder, and the second elastic member is coupled to the housing and a second end of the lens holder, the first end being opposite to the second end.

14. The camera module of claim 13, wherein the first elastic member comprises a first end portion coupled to the housing and a second end portion abutted against the first end of the lens holder.

15. The camera module of claim 13, wherein the second elastic member comprises a first end portion coupled to the housing and a second end portion abutted against the second end of the lens holder.

16. The camera module of claim 1, wherein the first lens module is coupled to the lens holder via screw threads.

17. The camera module of claim 1, wherein the second lens module is coupled to the lens holder via screw threads.

* * * * *